United States Patent Office 2,951,854
Patented Sept. 6, 1960

2,951,854
BIS-EPOXIDES OBTAINED FROM 2,2,3,3-TETRA-HALO-1,4-BUTANEDIOL AND METHODS OF MANUFACTURE OF THE SAME

Max E. Chiddix and Robert W. Wynn, Easton, Pa., assignors to General Aniline & Film Corporation, New York, N.Y., a corporation of Delaware No Drawing. Filed June 12, 1957, Ser. No. 665,121

10 Claims. (Cl. 260—348)

The invention here presented is a new and useful compound and a new and useful process for making it; the compound being a new condensation product of a halogen containing butanediol with epichlorohydrin; the halogen being present as pairs of halogen atoms on adjacent central carbon atoms of the chain, the condensate being a bis-glycidyl ether of 2,2,3,3-tetrahalo-1,4-butanediol or a chlorhydrin ether of 2,2,3,3-tetrahalo-1,4-butanediol.

This application utilizes a portion of the invention, the 2,2,3,3-tetrachloro-1,4-butanediol disclosed and claimed in the copending application of Robert Walter Wynn, Serial No. 548,769, filed November 23, 1955, for a process for the manufacture of 2,2,3,3-tetrachloro-1,4-butanediol, the disclosure of which application is herewith incorporated into and made a part of the present application.

Epichlorohydrin has long been known as a valuable and highly reactive substance from which many other valuable and important substances can be made. The present invention is a new and useful reaction utilizing the reactivity of epichlorohydrin or similar substance to combine it with a halogenated alcohol or glycol such as 2,2,3,3-tetrachloro-1,4-butanediol or 2,2,3,3-tetrafluoro-1,4-butanediol. This reaction yields a new composition of matter which is very valuable as an insecticide, a flameproofing agent for cotton, a paint component, a solvent and an intermediate for the preparation of a great many other substances such as synthetic resins, dyestuffs, pharmaceuticals and a wide range of other substances and compounds.

According to the present invention it is now found that a chlorinated alcohol of the type of 2,2,3,3-tetrachloro-1,4-butanediol reacts very readily with epichlorohydrin, especially in the presence of dilute caustic solution to yield a bis-chlorohydrin ether which has many important uses. Particularly, the bis-chlorohydrin ether is readily converted by a dehydrohalogenation reaction into a glycidyl ether which also has many valuable properties and important uses for the preparation of other chemical compounds, the bis-chlorohydrin ether being especially useful for the preparation of a new type of chlorine-containing synthetic resins.

In the present disclosure the compounds used are primarily the chlorine substituted reactives. However, the invention is not limited to chlorine only since the other halogens also form analogous compounds which are broadly, similarly reactive.

It may be noted that the reaction may yield not only a condensation between two molecules of epichlorohydrin and one of the 2,2,3,3-tetrachloro-1,4-butanediol which may be obtained in reasonably high purity by reaction between one molecular quantity of the diol with two molecular quantities of the epichlorohydrin, but by an increase in the amount of diol present, a condensation occurs between molecules of the diol and the glycidyl ether to yield a polymolecular chain of the diol with terminal groups derived from epichlorohydrin, and the product so prepared is a mixture of molecules having from 1 to 20 diol molecules condensed in a linear chain with the chain terminated by groupings derived from the epichlorohydrin.

The course of the reaction may be indicated by the following equation:

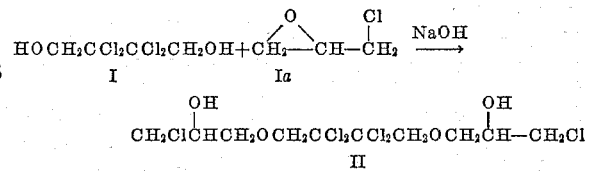

in which component I is the 2,2,3,3-tetrachloro-1,4-butanediol, and item Ia is the epichlorohydrin, which combine to yield compound II, which is the bis-chlorohydrin ether.

This compound II then is readily converted by a dehydrohalogenation reaction, utilizing such reactants as sodium or potassium hydroxide, to yield the glycidyl ether having the following structure:

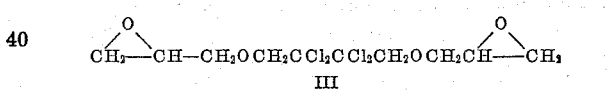

It will be observed that the initial condensation reaction between the epichlorohydrin and the diol occurs in the presence of caustic, and the conversion to the glycidyl ether likewise occurs in the presence of caustic. Accordingly the two reactions above indicated may proceed simultaneously for the production of more complex compounds such as:

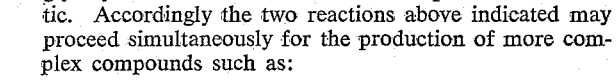

in which $n$ may have any value from 0 to about 20. This factual situation permits a certain amount of competition in the reaction between additional epichlorohydrin and the glycidyl ether for alcoholic hydroxyl, thus:

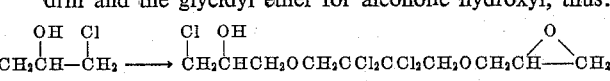

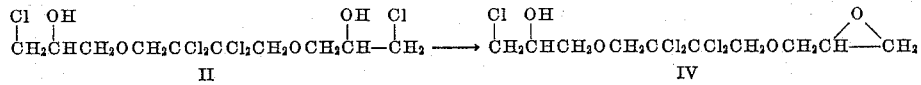
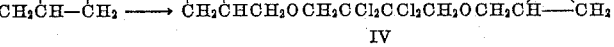
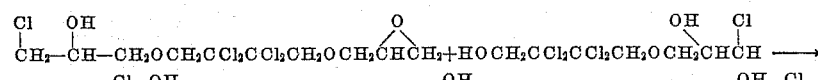
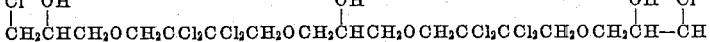

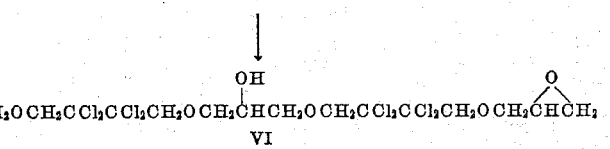

It will be evident from these equations, that the final product is not a single pure compound, but is a mixture of compounds containing, condensed thereinto, varying numbers of 2,2,3,3-tetrachloro-1,4-butanediol molecules; and analytical methods applied to the product determine merely an average value for $n$, as shown in the above structural formula. It may further be noted that the usual value for $n$ is from 0 to 3 or 4 inclusive, but the number of molecules as the higher molecular weight compounds can be increased by the presence of excess epichlorohydrin, and by the stepwise, slow, addition of aqueous alkali metal hydroxide over relatively long periods of time.

It is found that the lower molecular weight compounds can be separated in substantially pure form by careful distillation in vacuum, and with the lower molecular weight compounds removed, the higher molecular weight members can be separated by molecular distillation. However, for most purposes, it is not necessary to isolate the various molecular weight compounds.

The resulting compound is particularly well adapted to further reactions. That is the addition of an aliphatic polyalcohol or glycol may be used to produce a still further reaction. Thus an amount of a polyhydric alcohol less than the molecular equivalent yielding a cross-linking reaction by which polymer molecular weight and higher melting point epoxy resins which are particularly valuable since they are thermo plastic and this reaction is in a way the equivalent of a curing reaction, although it does not cure the compound to the point of a thermo setting resin. If amounts of the polyhydric alcohol greater than the molecular equivalent are added, all of the epoxy groups in the compound of the invention react with part only of the polyhydroxy groups of the alcohol to produce polymeric substances suitable for esterification to form high molecular weight esters which are suitable for further reaction; the product having many of the properties of the drying oil. If the amount of polyhydric alcohol added is strictly an equivalent amount, an incomplete reaction is obtained which leaves some unreacted epoxy groups, and some unreacted hydroxy groups present in the product making it possible to obtain both cross-linking and higher esters. These reactions are primarily those of the aliphatic dihydroxy alcohols or glycols.

If a polyhydric alcohol having more than two hydroxyl groups per molecule is used, in less than equivalent amounts there is obtained a cross-linking by reaction of the hydroxy groups with different epoxy groups, usually, or in large part from different molecules but still leaving some of the epoxy groups unreacted. This procedure yields a considerably higher melting point resin and is even nearer to a curing reaction, although as before it does not yield a thermo setting resin. If on the other hand more than an equivalent amount of the polyhydric alcohol is added, all of the epoxy groups may be reacted and a substantial number of hydroxyl groups are left unreacted. As before, the excess hydroxyl groups are suitable for esterification and may be used for forming a wide variety of esters which are particularly suitable for use as drying oils.

Other similar reactions are available with such substances as the fatty acid amine salts and the reactions are closely similar. This reaction is particularly advantageous with salts from such amines as: Methylamine, di- and tri-methylamine, mono-, di, and tri-ethylamine, ethanolamine, tri-ethanolamine, 2-chloroethylamine, di-isopropylamine, hexylamine, diethylenetriamine, 1,3-propanediamine, N, N-diethyl-1,3-propanediamine, cetyldimethylamine, nonylamine, hexamethylenediamine, morpholine, N-butylmorpholine, aniline, N-N-dimethylaniline, benzylamine, dimethylaminoethylphenol, chloroaniline, pyrole, pyridine, pyrimidine, piperazine, menthane diamine, and the like, and such acids as: Formic, acetic, propionic, acrylic, propiolic, butyric, isobutyric, valeric, caproic, caprylic, capric, 2-ethylhexoic, lauric, sorbic, myristic, palmitic, stearic, oleic, linoleic, and the like, being representative of usable substances these listed being the preferred ones.

Thus the product of the invention, as produced by the process of the invention, provides new and useful compounds in the form of bis-chlorohydrin ethers and glycidyl ethers.

Other objects and details of the invention will be apparent from the following description.

The primary component of the present invention is a 2,2,3,3-tetrahalo-1,4-butanediol, as disclosed for example in the above mentioned copending application. This material may be used as produced by the reactions disclosed above or it may be purified by various of the customary purification methods, such as distillation or precipitation or crystallization, as desired, although for most purposes, especially those of the present invention, the presence in the material of some impurities does not interfere with the reaction.

The reaction is catalyzed by caustic, usually in moderately dilute solution. Sodium and potassium hydroxides are the preferred catalysts. Alternatively such mild alkalies as lime or magnesium hydroxide are usable as catalyst and even lithium hydroxide may on occasion be used for a specific delicate reaction. In other words the alkalies and alkaline earths in general are usable.

The reaction may be conducted in the presence of diluents such as water and various of the lower alcohols, especially isopropyl alcohol, although such alcohols as ethylene glycol, glycerol, methyl, ethyl, propyl, and butyl alcohols are similarly usable. It may be noted that any of the liquid water soluble alcohols are usable even though they are not fully mixable with water.

The temperature of reaction is usually not critical although some control is desirable, the initial portion of the reaction being preferably conducted at temperatures not much removed from room temperatures, the final portion of the reaction being conducted at moderately elevated temperatures.

These items are exemplified in detail in the following examples, which are offered as showing the best method now known of practicing the invention, not as imposing limitations of any sort upon the claims.

EXAMPLE 1

Into a 500 cc. flask equipped with a stirrer, thermometer, and dropping funnel are charged 3.0 g. (0.075 M) sodium hydroxide pellets
50.0 cc. water
50.0 cc. isopropyl alcohol and
22.8 g. (0.1 M) 2,2,3,3-tetrachloro-1,4-butanediol. After complete dissolution, there is added through a dropping funnel
37.1 g. (0.4 M) epichlorohydrin at 25–30° C. in 0.25 hour. The mixture is immediately heated to 52° C. and held at 52–58° C. for 3 hours. It is then cooled to 30° C. and
14.0 g. (0.35 M) sodium hydroxide pellets added in small portions over one hour period so that without external cooling the temperature does not rise above 42° C. After the addition is completed, the mixture is stirred 2 hours longer and then
150.0 cc. benzene and
50 cc. water are added. After mixing, the benzene layer is separated from the water layer and washed twice with cold water. The benzene is removed under aspirator vacuum and the residue heated to 120–125° C. under 0.05 mm. pressure for 1 hour.
Yield: 28.0 g.
Analysis: Milliequivalents epoxide/gram=4.156
Average value of $n=.52$.

It will be observed that this procedure conducts the two reactions, pointed out above, for the condensation and dehydrohalogenation in the same reactor without interruption, to yield the desired glycidyl ether.

EXAMPLE 2

A 3-liter flask equipped with stirrer, thermometer and dropping funnel is charged with 9.0 g. (0.225 M) sodium hydroxide pellets,
150.0 cc. water and
150.0 cc. isopropyl alcohol. The mixture is cooled to 10° C. and
68.4 g. (0.3 M) 2,2,3,3-tetrachloro-1,4-butanediol added. After dissolution, there is added
83.4 g. (0.9 M) epichlorohydrin from a dropping funnel in 0.25 hour. The temperature is slowly raised to 35° C. and held at 35–40° C. for 5 hours. 0.75 hour after heating to 35° C., two phases begin to form.
16.5 g. (0.414 M) sodium hydroxide pellets are added over 1 hour period. The temperature is raised to 60° C. and held at 60–70° C. for 5 hours. The mixture is cooled to room temperature and
500 cc. benzene and
150 cc. water added. The benzene layer is separated from the aqueous phase and washed with two 150 cc. portions of cold water. The benzene is then removed under aspirator vacuum and the residue heated to 150–155° C. under 3.5 mm. pressure to remove water and excess epichlorohydrin.
Yield: 74.5 g.
Analysis: Milliequivalents of epoxide/gram=3.250
Average value of n=.97.

This procedure likewise yields the glycidyl ether as in Example 1.

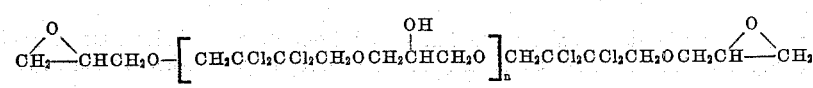

EXAMPLE 3

*Preparation of bis-chlorohydrin ether from tetrachlorobutanediol*

A 3-liter flask equipped with stirrer, thermometer and dropping funnel is charged with 9.0 g. (0.225 M) sodium hydroxide pellets
150.0 cc. water and
150.0 cc. isopropyl alcohol. The mixture is cooled to 10° C. and
68.4 g. (0.3 M) 2,2,3,3-tetrachloro-1,4-butanediol added. After dissolution there is added
83.4 g. (0.9 M) epichlorohydrin from a dropping funnel in 0.25 hour. The temperature is slowly raised to 35° C. and held at 35–40° C. for 5 hours. There is added
500 cc. benzene and
150 cc. water. The benzene layer is separated from the aqueous phase and washed with two
150 cc. portions of cold water. The benzene is then removed under aspirator vacuum and the residue heated to 120–125° C. for 2.5 hours under 0.1 mm. pressure to remove water and excess epichlorohydrin.
Yield: 83.3 g.

EXAMPLE 4

*Epoxide from bis-chlorohydrin ether obtained from 2,2,3,3-tetrachloro-1,4-butanediol*

The entire product from Example 3 (83.3 g. (0.12 M) of bis-chlorohydrin ether)

50 cc. water and 50 cc. isopropanol are charged into a 1-liter 3-necked flask equipped with stirrer and thermometer. At 60–70° C.,
75 cc. (0.263 M) of 3.5 N aqueous sodium hydroxide is added over a 3 hour period. The mixture is cooled to room temperature and
150 cc. benzene added. The benzene layer is separated from the aqueous phase and washed with two
50 cc. portions of cold water. The benzene is removed under aspirator vacuum and the residue heated to 120° C. for 2 hours under 0.1 mm. pressure.
Yield: 73.0 g.

Thus the process of the invention condenses a chlorodiol with an epichlorohydrin type of substance to yield a condensate in the form of a bis-chlorohydrin ether which in turn is readily dehydrohalogenated to a glycidyl type ether.

These bis-epoxides are particularly valuable in the preparation of halogenated epoxy resins such as those disclosed in our copending application, Serial No. 631,015, filed December 28, 1956.

While there are above disclosed but a limited number of embodiments of the process and product of the invention it is possible to provide still other embodiments without departing from the inventive concept herein disclosed, and it is therefore desired that only such limitations be imposed upon the appended claims as are stated herein or required by the prior art.

The invention claimed is:

1. The bis-chlorohydrin ether of the structural formula

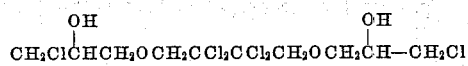

2. A glycidyl ether of the formula

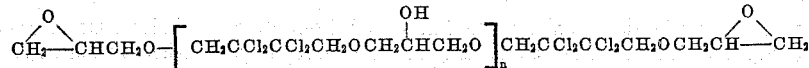

in which *n* is an average integer of from 0 to about 4.

3. The bischlorohydrin ether of the structural formula

wherein X represents a halogen selected from the group consisting of chlorine and fluorine.

4. A glycidyl ether of the formula

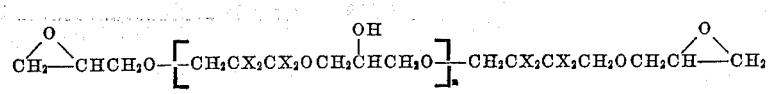

wherein X represents a halogen selected from the group consisting of chlorine and fluorine and *n* represents an average integer of from 0 to about 4.

5. The process for the preparation of the bis-chlorohydrin ether of the structural formula

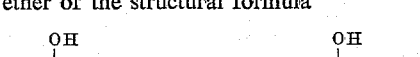

wherein X represents a halogen selected from the group consisting of chlorine and fluorine, which comprises condensing at from room to a slightly elevated temperature, 1 molar proportion of a 2,2,3,3-tetrahalobutanediol selected from the group consisting of 2,2,3,3-tetrachloro-1,4-butanediol and 2,2,3,3-tetrafluoro-1,4-butanediol with 2 molar proportions of epichlorohydrin in an inert lower aliphatic alcohol solvent and in the presence of an alkali.

6. The process for the preparation of the bis-chlorohydrin ether of 2,2,3,3-tetrachlorobutanediol which comprises condensing at from room to a slightly elevated temperature, 1 molar proportion of 2,2,3,3-tetrachloro-1,4-butanediol with 2 molar proportions of epichlorohydrin in an inert lower aliphatic alcohol solvent and in the presence of an alkali.

7. A process for the preparation of glycidyl ether of the formula

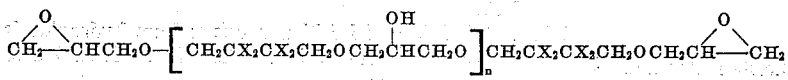

wherein X represents a halogen selected from the group consisting of chlorine and fluorine and $n$ represents an average integer of from 0 to about 4, which comprises condensing at from room to a slightly elevated temperature, 1 molar proportion of a 2,2,3,3-tetrahalo-1,4-butanediol selected from the group consisting of 2,2,3,3-tetrachloro-1,4-butanediol and 2,2,3,3-tetrafluoro-1,4-butanediol with at least 2 molar proportions of epichlorohydrin in an inert lower aliphatic alcohol solvent and in the presence of an alkali to thereby produce the chlorohydrin ether of said 2,2,3,3-tetrahalo-1,4-butanediol and further heating the thus formed chlorohydrin ether while adding alkali to thereby dehydrohalogenate the same and obtain said glycidyl ether.

8. A process for the preparation of glycidyl ether of the formula

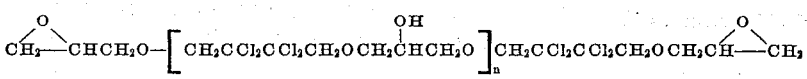

wherein $n$ represents an average integer of from 0 to about 4 which comprises condensing at from room to a slightly elevated temperature, 1 molar proportion of 2,2,3,3-tetrachloro-1,4-butanediol with at least two molar proportions of epichlorohydrin in an inert lower aliphatic alcohol solvent and in the presence of an alkali to thereby produce the chlorohydrin ether of said 2,2,3,3-tetrachloro-1,4-butanediol and further heating the thus formed chlorohydrin ether while adding alkali to thereby dehydrohalogenate the same and obtain said glycidyl ether.

9. A bis-chlorohydrin ether of the formula

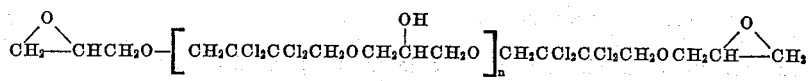

where $n$ represents an average integer of from 0 to about 4.

10. A process for the preparation of glycidyl ether of the formula

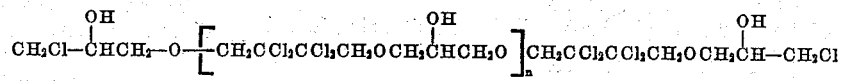

which comprises heating a bis-chlorohydrin ether of the formula

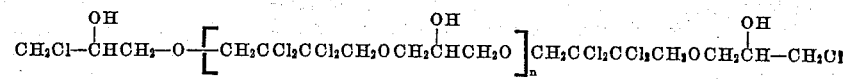

wherein $n$ represents an average integer of from 0 to about 4 while adding alkali thereto to therby dehydrohalogenate said bis-chlorohydrin ether composition and thereby obtain said diglycidyl ether composition.

References Cited in the file of this patent

UNITED STATES PATENTS

| | | |
|---|---|---|
| 2,538,072 | Zech | Jan. 16, 1951 |
| 2,581,464 | Zech | Jan. 8, 1952 |
| 2,712,000 | Zech | June 28, 1955 |
| 2,730,427 | Suen | Jan. 10, 1956 |

FOREIGN PATENTS

| | | |
|---|---|---|
| 488,698 | Canada | Dec. 9, 1952 |